US00RE35229E

United States Patent [19]

Blanch et al.

[11] E Patent Number: Re. 35,229

[45] Reissued Date of Patent: May 7, 1996

[54] COEMULSIFICATION OF OXIDIZED POLYETHYLENE HOMOPOLYMERS AND AMINO FUNCTIONAL SILICONE FLUIDS

[75] Inventors: Robert M. Blanch, Wilmington, Del.; Mark J. Kaszubski, North Massapequa, N.Y.; Gregory Borsinger, Boonton, N.J.; Irving B. Chang; Larry Krutzel, both of Morristown, N.J.

[73] Assignee: AlliedSignal Inc., Morris Township, N.J.

[21] Appl. No.: 408,502

[22] Filed: Mar. 22, 1995

Related U.S. Patent Documents

Reissue of:

[64] Patent No.: 5,238,731
Issued: Aug. 24, 1993
Appl. No.: 698,230
Filed: May 10, 1991

U.S. Applications:

[63] Continuation-in-part of Ser. No. 578,486, Sep. 7, 1990, abandoned.

[51] Int. Cl.[6] ..... B32B 7/00

[52] U.S. Cl. ..... 428/266; 427/387; 427/389.9; 428/375; 428/391; 428/392; 428/394; 428/395; 524/188; 524/388; 524/588; 524/838

[58] Field of Search ..... 427/387, 389.9; 428/266, 375, 391, 392, 394, 395; 524/188, 388, 588, 838

[56] References Cited

U.S. PATENT DOCUMENTS 4,767,646 8/1988 Cordova et al. ..... 252/8.6 X

*Primary Examiner*—Michael Lusignan
*Attorney, Agent, or Firm*—Michele G. Mangini

[57] ABSTRACT

Article comprising coemulsions of oxidized polyethylene with amino functional silicone fluids which includes at least one constituent selected from the group consisting of; ethoxylated aliphatic amines, ethoxylated nonylphenols, ethoxylated primary alcohols, ethoxylated secondary alcohols or other nonionic emulsifiers are taught, as well as processes for making the same. The coemulsions may also comprise further constituents, including but not limited to fatty acids, ammonium hydroxide, salts and water. Processes for the production of the coemulsion and articles comprising the same are also disclosed.

24 Claims, 3 Drawing Sheets

COEMULSIFICATION OF OXIDIZED POLYETHYLENE HOMOPOLYMERS AND AMINO FUNCTIONAL SILICONE FLUIDS

Matter enclosed in heavy brackets [ ] appears in the original patent but forms no part of this reissue specification; matter printed in italics indicates the additions made by reissue.

*CROSS REFERENCE TO RELATED APPLICATION*

*This invention is a continuation-in-part of U.S. application Ser. No. 07/578,486 filed Sep. 7, 1990 (abandoned).*

BACKGROUND

1. Field of the Invention

The invention relates to coemulsions of amino functional silicone fluids and oxidized polyethylene and processes for making the same.

2. Description of the Prior Art

Emulsions of various organic compounds are well known in many arts for their widespread utility. Exemplary are the use of emulsions in cosmetic compositions, including creams, lotions, cosmetic compositions, and the like. Other examples include uses as lubricating agents for sheet-like materials, including papers and fabrics, softening agents for textiles, fiber lubricants, paper release agents, metal working, coatings and as oil-recovery fluids from subterranean formations.

One particular use of emulsions comprising silicones and other organic materials, such as polyethylene are in the area of textiles, for such purposes as lubricants which aid during textile processing, and as conditioners to soften textiles or otherwise improve the tactile properties. such as the "hand" of the fabric (the term "fabric" is interchangeably called "textile") are well known. Further benefits of the use or such emulsions as lubricants include reduction of needle cutting and needle abrasion, improved abrasion resistance, increases in tear strength, and crease recovery.

Examples of such known compositions include U.S. Pat. No. 4,394,518 to Huber et al. for "Organic Fibers Having Improved Slip Properties" which is directed to a polymeric organosilicon compound containing aryl radicals and methods for using the compound for improving the slip properties of fibers. A further example is taught in U.S. Pat. No. 4,767,646 to Cordova et al. for "Wet Abrasion Resistant Yarn and Cordage" which teaches an oxidized polyethylene emulsified with a non-nitrogen nonionic emulsifiers and neutralized with an alkali hydroxide, and which further includes a amide melamine wax and a further siloxane containing compound. U.S. Pat. No. 3,844,826 to Buchner et al. for "Dressing Sewing Thread to Reduced Friction" teaches a sewing thread having improved slip characteristics which includes a non-friction coating of a polycarbonate-polydimethylsiloxane block copolymer, which preferably further includes a polydiorganosiloxane in its composition.

Technical Data sheet titled "The Use of A-C® Polyethylenes in Textiles" describes a family of emulsifiable polyethylenes and methods of making emulsion which include these products, as well as beneficial features which are imparted unto textiles through the use of these materials and compositions. However, this data sheet does not teach or suggest the invention to be presented herein.

While it is known to the an that an emulsion formed as a combination or comixture of an oxidized polyethylene-containing emulsion and a silicone-containing emulsion provide good resultant properties, including good lubricating properties for both threads, fibers and woven fabrics, the relative cost of silicon-containing emulsions curtail their broader use. None of the art teaches a composition and a process for using a composition wherein an oxidized polyethylene and a silicone containing material are coemulsified and the emulsion so formed is then used to provide improved slip characteristics to a broad range of filament, fibrous, fabric and sheet type materials.

SUMMARY

There are provided articles comprising a coemulsion, wherein the coemulsion is a stable aqueous coemulsion of oxidized polyethylene or polyethylene copolymers with amino functional silicone fluids which includes at least one constituent selected from the group consisting of; ethoxylated aliphatic amines, ethoxylated octylephenols, ethoxylated nonylphenols, ethoxylated primary alcohols, ethoxylated secondary alcohols or other nonionic emulsifiers. The coemulsions may also comprise further constituents, including but not limited to fatty acids, ammonium hydroxide, salts and water.

There is also provided a method of producing a coated article comprising a coemulsion of oxidized polyethylene with amino functional silicone fluids, as described above wherein such method comprises process steps of: heating said constituents in the presence of water with agitation in a sealed and pressurized reaction vessel through the melt point of the oxidized polyethylene constituent, further raising the temperature of the constituents beyond the melt point of the oxidized polyethylene constituent to a maximum temperature, maintaining the constituents at this maximum temperature for a first residence time interval, cooling the constituents, and ultimately contacting an article with the coemulsion produced.

DESCRIPTION OF THE PREFERRED EMBODIMENTS

Throughout the body of the specification and the claims, all percentages are to be understood as weight percentages relative to a particular overall composition. unless specifically indicated as otherwise.

Suitable polyethylenes may be characterized as oxidized low density and high density homopolymers of ethylene, copolymers containing acrylates and ethylene, tarpolymers containing acrylates, esters and ethylene. These polyethylenes have preferably been oxidized to an acid number as determined by a standardized titration of KOH of about 5 and 55, more preferably between about 10 and 50, and most preferably between about 10 and 45. These polyethylenes typically have a density as determined by ASTM D-1505 in the range of about 0.85 to 1.05, more preferably in the range of about 0.87 to about 1.05, and most preferably, in the range of about 0.90 to about 1.00 Preferably, these oxidized polyethylenes exhibit a Brookfield viscosity at a temperature of 140 deg. C. of between about 185 and 6000 centipoises (hereinafter interchangeably referred to as "cps"), more preferably in the range of about 190 and 6000 cps, and most preferably in the range of between about 190 and 5500 cps. Such oxidized polyethylenes are currently commercially available from the Allied-Signal Corp., under the designations of A-C® 629 and 392. The former is described as having a density of 0.93 an acid number of 16 and a Brookfield viscosity of 200 cps, while the latter is described as having a density of 0.99 an acid number of 30 and a Brookfield viscosity of 4500 when measured at a temperature of 4500 deg C.

These oxidized polyethylenes as well as others which are useful in the practice of the instant invention may be obtained by oxidizing polyethylenes with air or oxygen by conventional procedures. Suitable methods are described in U.S. Pat. No. 3,060,163 to Erchak, Jr., U.S. Pat. No. 3,322,711 to Bush et al., which methods are all hereby incorporated by reference.

Appropriate amino functional silicone fluids which may be used in accordance with the invention are those which may be broadly described as amino organic modified polysiloxanes, alternatively known to the art as "polydiorganosiolxanes". Preferable polydiorganosiloxanes include those which include the characteristic of exhibiting an amine neutral equivalent in the range of approximately between about 1000 and 3000, more preferably in the range of between about 1200 and 3000, and most preferably in the range of between about 1250 and 2800. Examples of commercially available polydiorganosiloxanes which find use in the instant invention include those which are marketed under various trade designations. One suitable group of materials include Dow Coming® CSF and Dow Corning® SSF which are sold as textile softening and lubricating compositions. These materials are described as medium viscosity polydiorganosiloxane which comprise aminoalkyl groups affixed to a predominantly polydimethylsi1oxane structure. The amine neutral equivalent is described to be approximately 2000, the specific gravity at 25 deg. C. (77 deg. F.) of 0.96, and to have a viscosity at 25 deg. C. (77 deg. F.) of 1300 centistokes (hereinafter interchangeably referred to as "cst"). A further commercially available material includes UCARSIL® Magnasoft™ materials available from Union Carbide Corporation and marketed as textile softening compositions. These materials are described to be low viscosity amino functional silicones which have a viscosity of about 250 cst at a temperature of 25 deg. C (77 deg. F.). a specific gravity of 0.97 at 25 deg. C. (77 deg. F.). A further commercially available polydiorganosiloxane material includes those which are marketed by PPG-Mazer under the designations MASIL® 123 and MASIL® 124.

As had been noted, the microemulsion includes at least one constituent selected from the group consisting of: ethoxylated aliphatic amines, ethoxylated octylphenols, ethoxylated nonylphenols, ethoxylated primary alcohols, ethoxylated secondary alcohols. The at least one constituent selected from this group which is added to the polyethylene and the amino functional silicone fluid in accordance to the teaching of this present invention may be interchangeably referred to as the "additive system", and it is to be understood that the "additive system" includes only one or more of constituents, selected from: ethoxylated aliphatic amines, ethoxylated octyiphenols, ethoxylated nonylphenois, ethoxylated primary alcohols, ethoxylated secondary alcohols. It is further to be understood that while further composition, constituents, reagents and the like might find use in conjunction with the present invention, and which might be known to the an as useful additives, the term "additive system" as used throughout this specification and the claims are to be understood to be limited to the group of four constituents described.

The ethoxylated aliphatic amines which are suitable to the practice of the invention are those which may be described as saturated and unsaturated fatty amnes reacted with ethylene oxide. These materials which are useful an the practice of the present invention may be generally termed as the condensation products of ethylene oxide with a hydrophobic material such as a long chain aliphatic alcohol, ester, acid, ether or alkyl phenol. These materials which find use in conjunction with the invention are characterized by containing as the hydrophilic portion of the molecule a plurality of oxyethylene moleties. Suitable materials of this type may also be referred to as ethoxylated tallow amines, a designation commonly used in the art. Examples of preferred ethoxylated aliphatic amines which are presently commercially available iclude "Ethomeen T-12" and "Ethomeen 18/12" which is available from Akzo Chemie America and which is described as an ethoxylated tallowamine, more particularly described as bis-(2-hydroxyethyl) tallowamine. A further example includes "Varonic T-202" which may be described as a constituent having similar characteristics to those described in conjunction with Ethomeen T-12 above, and are believed to be functionally identical. Varonic T202 is at present commercially available from the Sherex Co., Chicago Ill. Further preferred ethoxylated amines include ethoxylated octylphenols and nonylphenols which may be described as being the reaction products of an octylphenol or a nonylphenol with ethylene oxide. Examples of preferred ethoxylated octylphenols and nonylphenols which find use with the instant invention include those which are sold under the designation "Igepal CO430" which is sold as a surfactant and available from GAF Corporation and which is described as an ethylene oxide, more particularly as nonylphenoxypoly(ethyleneoxy)ethanol having a molecular weight of 484, and a boiling point in excess of 93.30 deg. C.

Preferred ethoxylated alcohols include ethoxylated primary alcohols and ethoxylated secondary alcohols suitable in the practice of the present invention include those which may be described as the reaction product of a primary alcohol or a secondary alcohol and ethylene oxide. Examples of such commercially available ethoxylated alcohols include; "Tergitol 15-S-3" available from Union Carbide Corp. of Danbury, Conn. which is described as an ethoxylated secondary alcohol. "Ethal TDA-3" which is described as an ethoxylated tridecyl alcohol formed as the reaction product between stoichiometric quantities of 3 moles of ethylene oxide with one mole of tridecyl alcohol, "Neodol" which is commercially available from Shell Oil Corp. According to the invention, the polyethylene and amino functional silicone fluid further includes the additive system which consists of at least one constituent selected from among the group consisting of: ethoxylated aliphatic amines, ethoxylated octylphenols, ethoxylated nonylphenols, ethoxylated primary alcohols, ethoxylated secondary alcohols. Where the additive system consists of only one constituent, then it is to be recognized that the selected constituent forms 100 percent of the additive system's composition. It is preferred however that the additive system comprise at least two components where one component is an ethoxylated aliphatic amine, and the other component or components are selected from the remaining members of the group namely the ethoxylated nonylphenols, ethoxylated primary alcohols, and ethoxylated secondary alcohols. More preferably, the composition of the additive system consists of the following constituents in the following proportions: ethoxylated aliphatic amines 40–100% mol., ethoxylated nonylphenol, 0–60% mol, ethoxylated primary alcohols, 0–60% mol., ethoxylated secondary alcohols, 0–60% mol. Most preferably, the relative molar percentages of the constituents making up the additive system are present in the following ratios: ethoxylated aliphatic amines 60–100

%mol., ethoxylated nonylphenol, 0–40% mol., ethoxylated primary alcohols, 0–40% mol., ethoxylated secondary alcohols, 0–40% mol.

Additional constituents may be incorporated in to the inventive compositions, and such constituents may in any amount which does not detract from the benefits of the invention.

Water may be present in any quantity which does not have any detrimental effect upon the formation of the emulsion according to the teachings of the invention. Preferably, quantities of between about 30 to 90 percent by weight of the total composition, more preferably between about 45 to 90 percent by weight, most preferably between about 60 to 80 percent by weight of water are included in the total composition.

A further constituent which may be used in formulating microemulsion compositions include acetic acid in either glacial or dilute forms, which may be added in order to modify the relative acidity of the composition by adjusting the respective pH value thereof. Preferably, the pH should be maintained to adjust the relative affinity to the ethoxylated amine so that material exhibits a greater affinity to the olefins in the overall composition rather than an affinity to any water contained m the overall composition.

Hydrochloric acid, in either concentrated, i.e. approximately 37% concentrations, or dilute concentrations, i.e., 12% or less, may also be included in formulating the inventive compositions. When added, hydrochloric acid functions to provide a means to adjust the relative pH of the overall compositions as is described above.

Ammonium hydroxide is a further useful reagent which may be included in the composition and preferably, concentrated ammonium hydroxide of an approximate 30% concentration may be used. It has been observed that the presence of ammonia, in even minor amounts in microemulsion compositions according to the present invention imparts a beneficial effect upon the composition which is evidenced by reductions in the opacity of the microemulsions formed containing ammonia relative to the opacity of the microemulsions formed without containing ammonia. This is evident from the improved appearance and measured light transmission measurements which are factors known to the art to be indicative of the relative particle size in an emulsion.

Sodium salts, including but not limited to sodium chloride, sodium hydroxide, and sodium metabisulfite may be incorporated as a constituent, as the salt provides the desirable effect of reducing the viscosity, and where the salt is sodium metabisulfite, to improve the color and optical characteristics of the composition. The sodium salts may be in any form, such as a finely divided powder, or in a pelletized form, or alternately, the sodium salt may be dissolved in a reagent or other constituent, for example in the water comprising a composition which is subsequently combined with the other constituents. The salts may also be in various percentages, and may further include small amounts, i.e., 20% or less of inert materials which exhibit no detrimental effect upon the practice of the invention.

It is recognized and understood that although only particular constituents have been recited above, other materials which are known to the art which find use in the compositions of emulsions may be included, and such additives are considered as part of the invention disclosed herein.

The process for forming the microemulsions of the present invention are formed include the following process steps: heating the constituents used to form the microemulsion under conditions of constant agitation in a sealed and pressurized reaction vessel through the melt point of the oxidized polyethylene constituent, further raising the temperature of the constituents beyond the melt point of the oxidized polyethylene constituent to a maximum temperature, maintaining the constituents at this maximum temperature for a first residence time interval, then cooling the constituents. In an alternative embodiment of the process, the heating of the constituents comprises two heating steps; applying heat at a first heating rate to a first intermediate temperature and then heating the constituents from the first intermediate temperature to the maximum temperature at a second heating rate. Preferably, the first heating rate is greater than the second heating rate, i.e., a faster transmission of heat per unit of time occurs during the first heating rate than during the second.

Any suitable vessel capable of withstanding the operating parameters of the process may be used in conjunction with the present invention. By way of example, suitable reactors include those constructed of metals, glass, glass-lined metal reactors. Preferably, the reaction vessel is a batch type reaction vessel which may be sealed, and which is of sufficient strength so to withstand the pressure generated by the constituents during the process of forming the microemulsion.

It is contemplated that the reaction may be carried out in any manner, either in a batch type mode, or in a continuous mode or other mode of operation; any reaction mode which is successful in providing the conditions for the productions of the emulsions taught herein may be utilized. Preferably the reaction is carried out in a batch type mode.

Agitation means are meant to include any means, or alternately any method by which the constituents in the reactor may be well mixed, and by way of example, such means include rotary paddles, propellers, stirring rods, vanes and the like, as well as other methods which may comprise shaking, spinning or otherwise effecting movement of constituents within the reactor.

In a preferred embodiment of the process the selected constituents comprising an oxidized polyethylene, amimo functional silicone fluid, and the additive system as defined above, as well as other desired constituents are loaded into a reaction vessel which is sealed, and which includes agitation means. The selected constituents are heated, with agitation, at a first heating rate through the melting point of the oxidized polyethylene component for a first time interval, and then during a second time interval further heated at a second heating rate to raise the temperature to a maximum temperature or maximum temperature range approximately 7–10 deg. C beyond the melt point of the oxidized polyethylene component, and then maintaining the reactants at this maximum elevated temperature or maximum temperature range for a period of between about 10–15 minutes. After the period had elapsed, the materials were then cooled to room temperature. Agitation is maintained throughout the procedure.

The order of adding or combining the constituents are not critical, and they may be added in any order as is suitable for use with the reactor and the reaction method employed.

The relative acidity of the composition, i.e., the "pH" should be evaluated in order assure that the microcroemulsion is of suitable optical clarity. Preferably, the pH may be adjusted by modifing the amounts of the constituents used, especially by modifying the amount of acetic acid and/or hydrochloric acid used. Preferably, the pH of the microemulsion should be maintained in a range of between about 4 to 6, more preferably in the range of between about 4.5 and 5.5, and most preferably in the range of between about 4.75 and 5.25.

The coemulsification products of this procedure form stable coemulsions of the oxidized polyethylene and amino functional silicone fluid, which include particles in the size range of between about 0.0001 and 100 microns. Preferably, the products of this procedure have particle sizes in the range of between about 0.001 and 5 microns, and most preferably comprise particles having particle sizes in the range of about 0.001 and 1 micron. The small particle sizes of the present invention are generally classed as characteristic of a "micro-emulsion". As is well known in the art, the smaller particle sizes of the emulsion enhance the distribution of the silicon in the emulsions, and improve the distribution of the silicon within or upon the surface of and material, such as textile, paper or other sheet type material and thereby impart such desirable properties as lubrication, textural modification or other property with a consequent reduction in the amount of silicon or other constituent required to form a suitable coemulsion.

Determination of the optical characteristics of each of the compositions, as well as any control compositions were evaluated to determine their optical density from however that the additive system comprise at least two which the optical transmittance, and conversely, relative opacity, of a composition may be derived. This procedure is well known to the art to be a useful index of the average particle size contained in compositions. The evaluation of optical density was performed with the use of a Klett-Summerson Photoelectric Colorimeter, Model No. 800-3, which was equipped using a number 66 filter which is rated to have a spectral range of between 640 and 700 millimicrons. The values provided by the Klett-Summerson Photoelectric Colorimeter are termed "Klett Values" from which a corresponding optical densely and a percent light transmittance can be determined.

BRIEF DESCRIPTION OF THE DRAWING

A further optical evaluation of the inventive coemulsions and a blend of two emulsions, i.e. a polyethylene emulsion and an amino silicone containing emulsion was performed on a Leitz Ortholux optical microscope. The magnification was varied as described below, and a xenon lamp lighting source was used in either of lighting modes, phase contrast or what is commonly referred to in the art as a "transmitted dark-field" order to improve the contrast of the particular samples. The results of this evaluation is shown on FIGS. 1–8.

As may be seen by inspection. FIG. 1 which was produced using dark-field illumination illustrates particles which are generally non-uniform in geometrical configuration, particularly the particles denoted as 1,2 and 3. These particles have an amorphous and irregular configuration. Turning now to FIG. 2, illuminated using phase contrast lighting the same sample is viewed under a higher magnification, and two distinct particles are particularly apparent; the particle denoted as 4 is seen to have an irregular shape a particles illustrated in conjunction with FIG. 1, and the particle denoted 5 is seen to have a spherical or circular shape. The following FIG. 3 illuminated by phase contrast lighting, shows the same sample as the two prior magnifications at a higher magnification, and the particle denoted as 6 reveals a generally spherical particle, which is approximately 10 microns in diameter. The hazy interior suggests that the particle 6 has no internal structure, and it is hypothesized that the particle 6 is a suspended oil particle.

Turning to FIGS. 4–6, there is illustrated a sample of the coemulsion formed in accordance with the teachings of the present invention having the composition of the coemulsion labeled "K1" of Table K-1 noted below. Using a dark-field lighting mode, wherein the light from the light source passes at an angle nearly oblique to the sample, FIG. 4 illustrates a more uniform distribution of the particles resulting from the coemulsion technique taught in the instant specification. As may be seen thereon and in contrast to the sample illustrated on FIGS. 1–3, all of the particles distinctly visible on FIGS. 4–6 are of a generally spherical configuration, and the particles contain an internal structure. Such structure is most clearly seen on FIG. 5 which is also illuminated under a dark-field lighting mode, where a particle denoted as 7, an less readily visible from FIG. 4 in particles labeled 8 and 9. Upon inspection, an internal structure is visible within these particles, especially when viewed in contrast to FIGS. 1–3. While not fully understood, and not wishing to be limited to any particular theory, it is hypothesized that the structures observed in FIGS. 4–8 reveal an internal structure which comprises small pieces of polyethylene intermixed in silicone oil which suggests the formation of coemulsified particles of the polyethylene and the silicone rather than separate particles of polyethylene and separate droplets and/or particles of silicone, which is suggested as descriptive of the particles illustrated in FIGS. 1–3.

FIG. 6, illuminated under phase contrast lighting further shows visible particles having the internal structure noted above. Further, FIGS. 7 and 8 both further illuminated under dark-field lighting modes illustrate two further coemulsions according to the compositions of samples C14 as listed on Table C1 noted below. It should be noted that FIGS. 7 and 8 further illustrate successful coemulsions which reveal particles having internal structures apparently identical in nature to the particles illustrated on FIG. 4–6.

The samples utilized for the production of FIGS. 1–8 were further analyzed by photon correlation spectroscopy by methods which are outlined in the following references: Laser Light Scattering, by B. Chu published by Academic Press, New York, 1974; Dynamic Light Scattering, by B. Berne and R. Pecora, published by Wiley, New York, 1976 and Dynamic Light Scattering Applications of Proton Correlation Spectroscopy, R. Pecora, editor published by Plenum Press, New York, 1985. Determination of the size distribution of particles may be determined from photon correlation analysis by methods which are outlined in the following references: Provencher, S.; Hendrix, J.; DeMaeyer, J. J. Chem. Phys., 1975. Vol. 69, p. 4273 and Provencher, S. Makromol. Chem. 1979, Vol. 180, p.201. The samples of FIGS. 1–8 were analyzed in accordance with the methods described in the publications cited, the contents of which are herein incorporated by reference, and weight-average particle diameter "$d_w$", number-average particle diameter "$d_n$" and z-average particle diameter. "$d_z$" were determined. These values are defined in accordance with the following formulas:

$$d_w = \frac{\sum_i^N n_i M_i d_i}{\sum_i^N n_i M_i}$$

$$d_n = \frac{\sum_i^N n_i, d_i}{\sum_i^N n_i}$$

$$d_z = \frac{\sum_i^N n_i M_i^2 d_i}{\sum_i^N n_i M_i^2}$$

where, $M_i$ is representative of the mass of a particle, $d_i$, is representative of the diameter of a particle, and $n_i$ is the number of particles having a unit mass. The diameters in units of microns (μm) are listed in Table PD below.

TABLE PD

Figure 1:
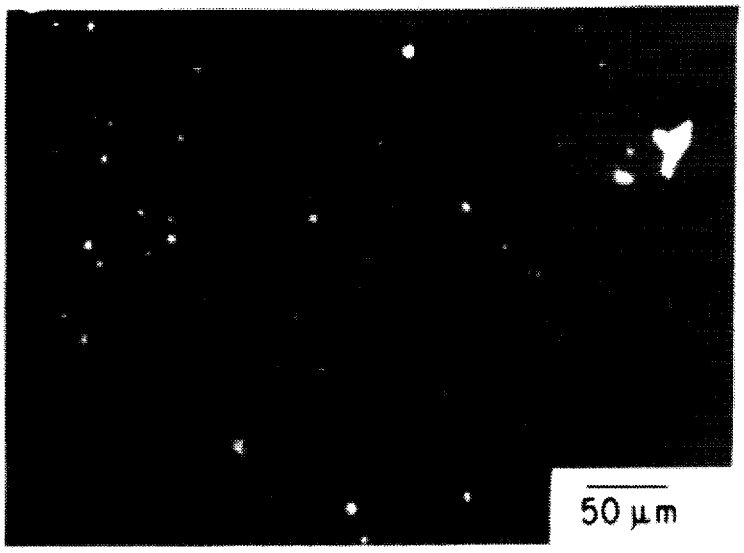
FIGS. 1–3 illustrate a cationic emulsion formed as a result of a blend of two emulsions produced by producing a mixture under pressure at a temperature range of 110–115 deg. C. of a low density oxidized polyethylene and 2 moles of an ethoxylated lallowamine surfactant in a reactor with stirring. using Masis® EM 115 a polydiorganosiloxane material commercially available from PPG-Mazer chemicals. The two blended emulsions were observed at magnifications of 260×, 650× and 1040×.
Figure 2:
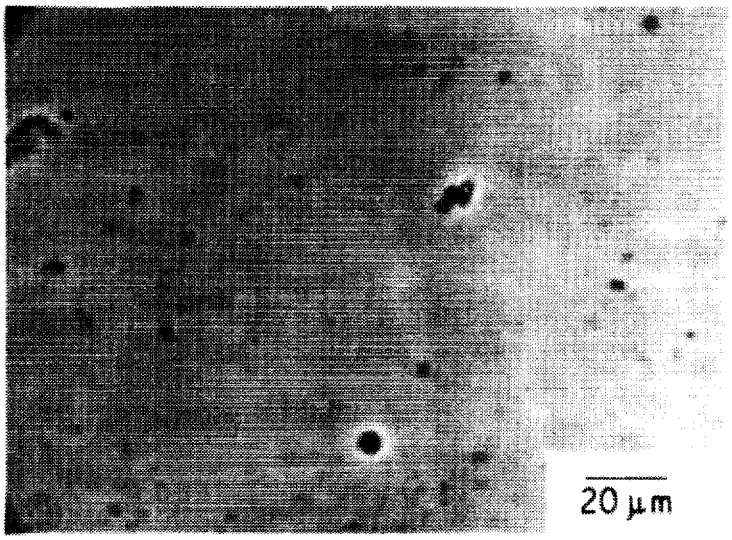
Figure 3:
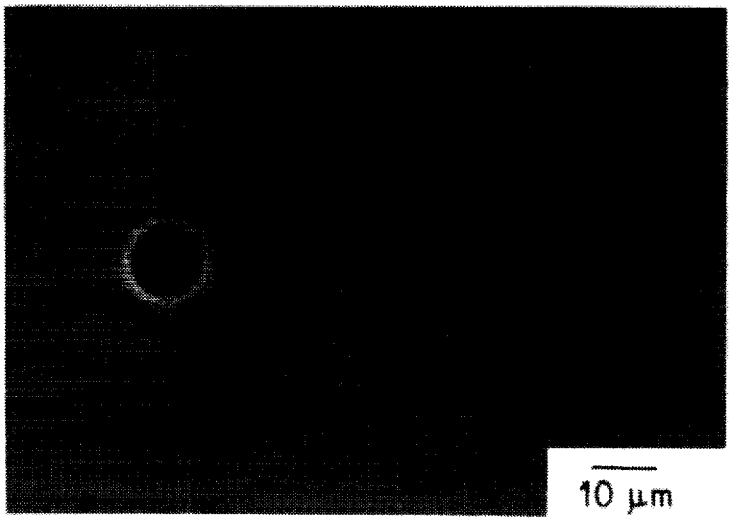
Figure 4:
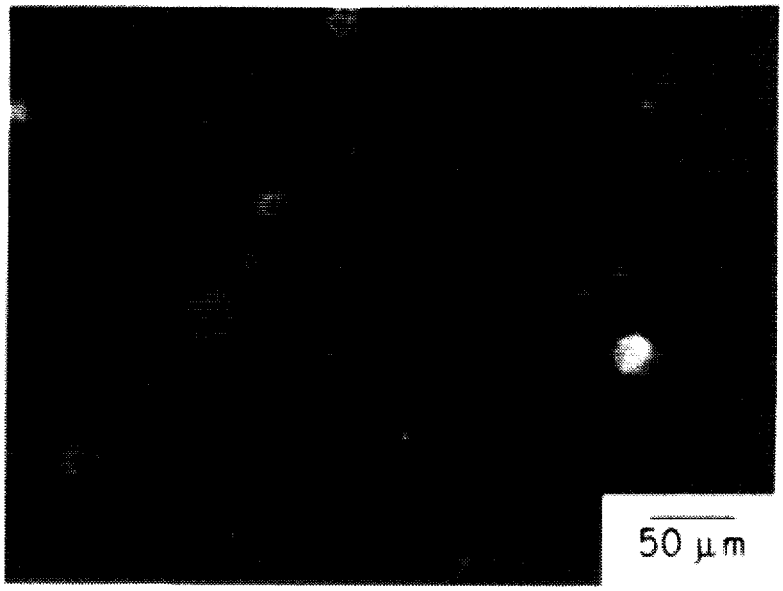
FIGS. 4–6 illustrate a coemulsion formed in accordance with the teaching of the instant invention, whose composition is described below as in Example K1. Similarly.
Figure 5:
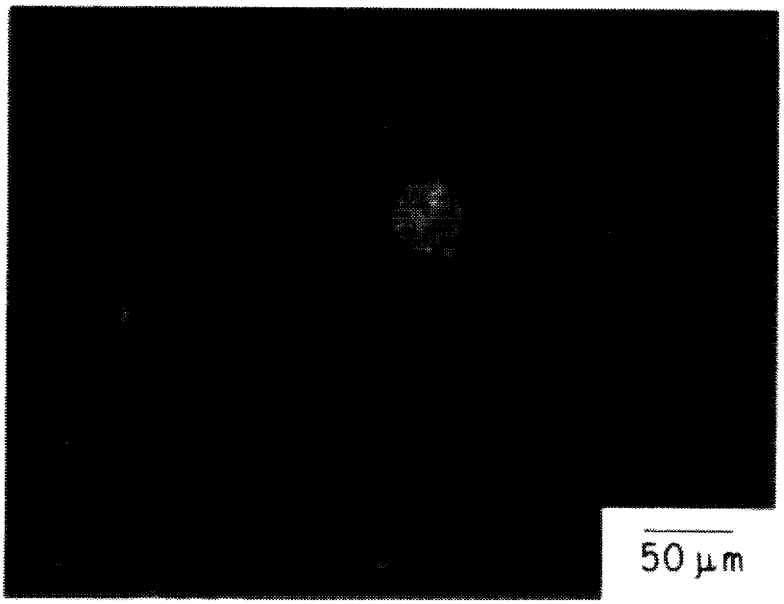
Figure 6:
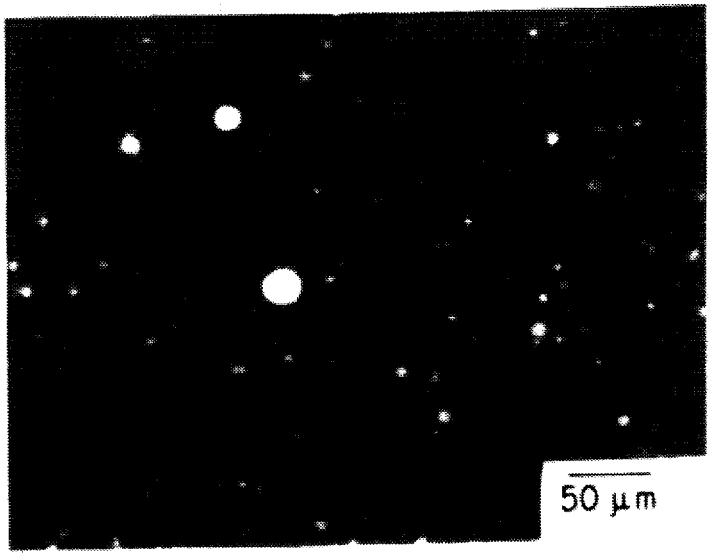
Figure 7:
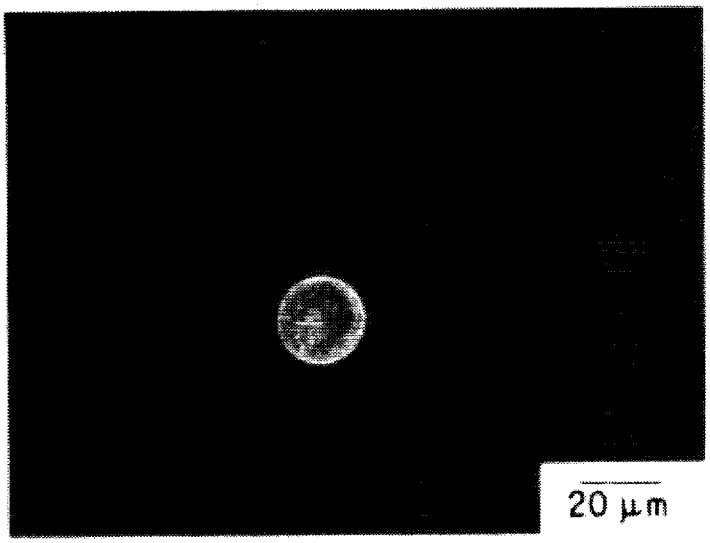
FIGS. 7–8 illustrate an inventive coemulsion whose composition is designated below as Example C14.
Figure 8:
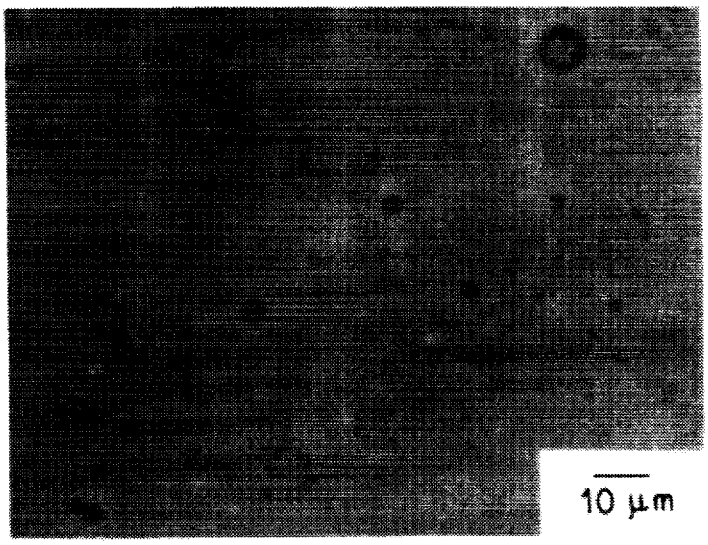

| Sample | Resultant Diameters, (μm) | | |
|---|---|---|---|
| Evaluated: | $d_w$ | $d_n$ | $d_z$ |
| FIGS. 1-3 | 0.028 | 0.007 | 0.145 |
| FIGS. 4-6 | 0.023 | 0.006 | 0.076 |
| FIGS. 7-8 | 0.012 | 0.005 | 0.069 |

From these reported results, it can be seen that while there was no distinctive differences in the number-average diameter, $d_n$ of the particles, and moderate differences in the weight-average diameter, $d_w$, of the particles, between the samples formed from the coemulsions in according with the teachings of the present invention (the samples of FIGS. 4–6 and FIGS. 7–8) and a blend of two emulsions (the sample of FIGS. 1–3), there is a striking difference in the evaluated z-average particle diameter $d_z$, which, for the inventive coemulsions has been observed to be less than for blended emulsions. This figure suggests that the average diameter of the coemulsion particles are generally smaller than that for blended emulsions, and while not wishing to be bound to this theory, might further be suggestive that they would provide an improvement in lubricative characteristics.

The coemulsions described above may be contacted to a variety of articles so to provide one or more of the following characteristic features: improved lubricity, improved anti-adhesive properties, improved tactile properties particularly for fibers, threads and textile applications, improved mold release agents for dies and molds for forming articles from thermoplastic resins.

Articles may be imparted with improved lubricative characteristics by contacting the articles with coemulsions described above by any effective method which method includes conventional methods, which methods include but are not limited to: immersion of the article, immersion of at least part of the article, spraying, coating, brushing-on, or otherwide contacting the coemulsions with the article.

Articles which are wholly or at least partially comprised of fibers including but not limited to textiles, fibers, ropes, tows, webs, threads, so-called "fiberfill" materials, as well as others are imparted with improved lubricity, improvements in the tactile quality of the article as is commonly referred to in the textile art as "hand", as well as improved softness of the article.

Paper and other flexible sheet type articles including but not limited to paper sheets, sheets and films formed from of thermoplastic compositions such as polyesters, may be provided with an anti-adhesive coating and with improved slip characteristics. Paper and flexible sheet type articles coated with the coemulsion of the present invention provide a useful carrier or release coating for a wide range of adhesives, and other materials which exhibit adhesive properties.

One class of adhesives with which the coemulsions of the present inventions find use are with pressure sensitive adhesives and other adhesives which are desirably applied to the surface of one material, upon to which a release paper, release strip or release sheet is applied so to protect the pressure sensitive adhesive until ready for use. In use, the release paper, release strip or release sheet is removed, leaving a major portion of the pressure sensitive adhesive in contact with the material upon which it was applied. Examples of such articles include tapes, sheets, decals, labels, envelopes, as well as other paper and sheet type articles as well as other articles not enumerated here upon which the pressure sensitive adhesive may be applied. The coemulsions of the present invention find particular use as a coating for the release sheet, release film, release strip or release paper described and feature poor adhesion to the pressure sensitive adhesive, which is desirable property.

A further class of materials which exhibit adhesive properties include asphalt containing compositions and articles comprising asphalt. Examples of such articles include roofing shingles, and other roofing materials, and packaging containers for asphalt containing compositions. The coemulsion compositions taught in the instant invention provide structures featuring good release properties for use in conjunction with asphalt containing compositions and articles comprising asphalt.

Roofing shingles such as those presently in common use in North America for buildings, residential buildings and other structures may be generally described as a substantially sheet type article having a length dimension greater than a width dimension, and two opposite faces, an "upper face" upon which is conventionally placed a series or alternately a step of a heat curing adhesive, and on the "lower face" the reverse side of the roofing shingle) there is desirably placed a release material which is non-adhesive, or exhibits only limited adhesive charactenstics when contacted with the heat curing adhesive. During the production, shipment and storage of such roofing shingles prior to their installation of a structure, packaged roofing shingles are layered in register to form a stack wherein the heat curing adhesive of the upper face of a shingle will be retained in contact with the release material on the lower face of an adjacent roofing shingle. It is highly undesirable that, prior to installation of the shingle, that adhesion of adjacent shingles be realized. Presently, it is known to the art to utilize a silicon coated thermoplastic tape. typically comprising poly(ethylene terephthalate) which is applied to the lower face of a roofing shingle. However effective, this solution is a cost and labor intensive solution.

The coemulsions of the present invention when contacted with the lower face of the shingle, preferably in the region of the lower face of the shingle which will contact the heat sensitive adhesive of an adjacent roofing shingle prior to the installation of the roofing shingles provides a very satisfactory release coating which may be directly applied to the lower surface of a roofing shingle and form a layer of the coemulsion thereon. Alternatively, the coemulsions of the present invention may be used to produce a release tape or material of a fiber, paper or thermoplastic material such as a polyester tape which is coated with the coemulsion and afterwards applied to the lower face of the roofing shingle in accordance with conventional methods known to the art. Preferably, such a release tape or material for use with a roofing shingle is a paper tape or a sheet, or a polyester tape or sheet; most preferably such a release tape or material is a polyester tape or sheet such as poly(ethylene terepthalate).

Packaging containers ners for asphalt, commonly paper containers which are used to contain a mass of asphalt may be coated on the surfaces of the container which are to contact the asphalt with the coemulsions of the present invention. The coemulsions of the present invention provide improved release properties as compared to an uncoated packaging container.

Generally, it may be broadly stated that the coemulsions taught in the present invention may be substituted in applications wherein it is presently known to the art to use a silicone coating and to replace the silicone coating being used.

The foregoing invention will be more apparent by reference to specific embodiments which are representative of the invention. It is nonetheless to be understood that the particular embodiments described herein are provided for the purpose of illustration, and not be means of limitation, and that it is to be further understood that the present invention may be practiced in a manner which is not exemplified herein without departing from its scope.

EXAMPLES

In the descriptions of the following compositions, as well as the tables, all measurements relating to the individual constituents are listed in units of grams unless indicated otherwise. The emulsion, was evaluated by immersing a portion of a clean glass laboratory slide into the reaction product and withdrawing it, at which point the appearance of the slide was observed.

EXAMPLES C1–C14

In the formulations for the compositions according to Examples C1–C14 a stainless steel reactor having a capacity of 2 liters and equipped with an electrical resistance-type heating system in the form of coils which was placeable near the exterior of the reactor, and a stirrer attached to variable speed electric motor, as well as a thermometer. This reactor is interchangeably referred to as the "reactor", "reaction vessel" or "vessel". This stainless steel reactor was emptied and thoroughly cleaned before the formulation and production of each of the Examples unless otherwise specifically indicated.

The resultant reaction products of each of the compositions, i.e., the emulsions, were evaluated for their. Klett values in accordance with the directions of the manufacturer of the Klett-Summerson Photoelectric Colorimeter from which the optical density and percent light transmittance was derived. The relative acidity, or pH values was determined by the use of Corning pH meter equipped with a glass electrode. EXAMPLE C1.

All the constituents according to those outlined in Table C1 except for the 0.5 g of sodium chloride were charged into the reactor after which the charged reactor was sealed.

TABLE C1

| Material | C1 | C2 | C3 | C4 | C5 | C6 | C7 | C8 | C9 | C10 | C11 | C12 | C13 | C14 | C15 |
|---|---|---|---|---|---|---|---|---|---|---|---|---|---|---|---|
| A-C 629 | 128 | 128 | 128 | 128 | 128 | 128* | 128* | 128* | 128* | 128* | 128* | 128* | 128** | 128** | 128** |
| A-C 316 | | | | | | | | | | | | | | | |
| Dow CSF | 32 | 32 | 32 | 32 | 32 | 32 | 32 | 32 | 32 | 32 | 32 | 32 | 32 | 32 | 32 |
| Ethomeen 18-12 | | | | | | | | | | | | | | | |
| Ethomeen T-12 | 56.8 | 56.8 | 56.8 | 56.8 | 56.8 | 56.8 | 51.2 | 51.2 | 51.2 | 51.2 | 51.2 | 51.2 | 51.2 | 51.2 | |
| Igepal CO-430 | 14.2 | 14.2 | 14.2 | 14.2 | 14.2 | 15 | 12.8 | 12.8 | 12.8 | 12.8 | 12.8 | 12.8 | 12.8 | 12.8 | 12.8 |
| Varonic T-202 | | | | | | | | | | | | | | | 51.2 |
| glacial acetic acid | 8 | 7.4 | 7.4 | 6.4 | 6.7 | 7 | 7.2 | 7.2 | 7.2 | 7.5 | 7.5 | 7.5 | 7.5 | 7.5 | 7.5 |
| hydrochloric acid, 10% | | | | 5 | | | | | | | | | | | |
| hydrochloric acid, 37% | | | | | 5.4 | 1 | 2 | 3.2 | 1 | | | | | | |
| ammon. hydrox. conc. 30% | | | | | | | | | | 0.25 | | 0.25 | 0.25 | 0.2 | 0.2 |
| sodium chloride | 0.5 | 0.5 | 0.5 | 0.5 | | | | | | | | | | | |
| sodium hydroxide | | | | 0.3 | | 0.2 | 0.3 | 0.3 | 0.3 | | | | | | |
| sodium metabisulfite | | | | | 0.75 | | | | | 0.5 | 0.4 | 0.5 | 0.5 | 0.5 | 0.5 |
| potassium hydroxide | | | | | | | | | | | | | | | |
| water | 514.4 | 514.4 | 514.4 | 514.4 | 514.4 | 514.4 | 514.4 | 514.4 | 514.4 | 514.4 | 514.4 | 514.4 | 514.4 | 514.4 | 514.4 |
| composition pH | 5.3 | 5.3 | 4.9 | 4.65 | 4.65 | 5.2 | 5.15 | 5.05 | 5.05 | 4.98 | 4.8 | 5.05 | 5.05 | 5.05 | 5.05 |
| Klett value | 425 | 325 | 350 | — | — | 450 | 400 | 400 | 430 | 242 | 425 | 198 | 340 | 82 | 85 |
| optical density | 0.85 | 0.65 | 0.699 | — | — | 0.9 | 0.8 | 0.8 | 0.86 | 0.495 | 0.85 | 0.396 | 0.68 | 0.164 | 0.19 |
| light trans, % | 14 | 20.4 | 20 | — | — | 12.59 | 15.86 | 15.86 | 13.72 | 32.84 | 14 | 40.16 | 20.9 | 68.57 | 67.66 |
| slide appearance | clear | clear | clear | cloudy | milky | clear | clear | clear | clear | clear | clear | clear | clear | clear | clear |

| Material | C16 | C17 | C18 | C19 | C20 | C21 | C22 | C23 | C24 | C25 | C26 |
|---|---|---|---|---|---|---|---|---|---|---|---|
| A-C 629 | | | | 128*– | 128*– | 128*— | 128*— | 144*— | 128*— | 160*— | 160*— |
| A-C 316 | 128 | 128 | 128 | | | | | | | | |
| Dow CSF | 32 | 32 | 32 | 32 | 32 | 32 | 32 | 32 | 32 | 40 | 40 |
| Ethomeen 18-12 | | 51.2 | | | | | | | | | |
| Ethomeen T-12 | 51.2 | | 51.2 | 51.2 | 51.2 | 51.2 | 51.2 | 51.2 | 51.2 | | |
| Igepal CO-430 | 12.8 | 12.8 | 12.8 | 12.8 | 12.8 | 12.8 | 12.8 | 12.8 | 12.8 | | 12.8 |
| Varonic T-202 | | | | | | | | | | | 51.2 |

TABLE C1-continued

| | | | | | | | | | | | |
|---|---|---|---|---|---|---|---|---|---|---|---|
| glacial acetic acid | 7.5 | 7 | 6.5 | 7.5 | 7.5 | 7.5 | 7.5 | 7.5 | 7.5 | | 9.5 |
| hydrochloric acid, 10% | | | | | | | | | | | |
| hydrochloric acid, 37% | | | | | | | | | | | |
| ammon. hydrox. conc. 30% | 0.2 | 0.2 | 0.2 | 0.2 | 0.3 | 0.2 | 0.2 | 0.2 | 0.2 | | 0.2 |
| sodium chloride | | | | | | | | | | | |
| sodium hydroxide | | | | | | | | | | | |
| sodium metabisulfite | 0.5 | 0.25 | 0.25 | 0.5 | 0.5 | 0.5 | 0.5 | 0.5 | 0.5 | | |
| potassium hydroxide | | | | | | | | | | 2.5 | 2.5 |
| water | 514.4 | 515 | 515 | 514.4 | 514.4 | 514.4 | 514.4 | 514.4 | 514.4 | | 514.4 |
| composition pH | 5 | 5 | 5.2 | 5.15 | 5.1 | 4.8 | — | — | — | — | 5 |
| Klett value | 450 | 360 | 350 | 118 | 185 | 67 | — | — | 83 | — | 600 |
| optical density | 0.9 | 0.72 | 0.69 | 0.238 | 0.38 | 0.134 | — | — | 0.166 | — | 1.2 |
| light trans, % | 12.6 | 19 | 20 | 58 | 42.7 | 73.5 | — | — | 68.3 | — | 6.33 |
| slide appearance | clear | good | clear | clear | clear | clear | cloudy | cloudy | clear | — | good |

Notes
"*" = indicates an acid value of 16.2
"**" = indicates an acid value of 15.9
"*–" = indicates an acid value of 16.9
"*—" = indicates an acid value 15.7

No pressure or gas was added to the reactor during the production process. The electric motor was then energized so that the stirrer assured that the constituents were well agitated and the contents of the vessel were slowly heated at a rate of approximately 2 to 5 deg. C./min until the contents of the reactor reached a temperature of 110 deg. C. The heating system was then stopped, and the reactor and its contents cooled for approximately 15–20 minutes by withdrawing the reactor from the heating coils and immersing the reactor in water at a temperature of approximately 20–22 deg. C. During this cooling phase, the stirrer continued to operate so to assure that the contents of the reactor remained thoroughly agitated. When the reactor contents reached a temperature of approximately 30–35 deg. C., the stirrer was halted, and the reactor vessel was opened to allow for the addition of the 0.5g sodium chloride min the form of a finely divided powder. The reactor was again sealed, and the operation of the stirrer re-initiated. As before, the heating system was initiated and the reactor and its contents were heated at a rate of approximately 2–5 deg. C./min until the constituents in the reactor reached a temperature of 110 deg. C. With the agitation of the constituents continuing, the heating system was disengaged and the reactor allowed to cool in a water bath as described before until it reached a temperature of 30–35 deg. C.

Upon evaluation, the Klett value was found to be 425, which corresponds to an optical density of 0.85, and a light transmission of 14%. The relative acidity testing yielded a pH value of 5.3. The glass slide test revealed an emulsion which had a clear appearance. These results are summarized on Table C1.

EXAMPLE C2

The reactor vessel as described above used for the production of Example C1 was charged with all of the constituents and sealed. Agitation was initiated and maintained to assure the adequate mixing of the constituents. and the reactor vessel was heated. The temperature of the constituents was raised according to the manner outlined for Example C1. After reaching the temperature of 110 deg. C., heat was supplied to the reaction vessel so to maintain a constant temperature of 110 deg. C. for a period of ten minutes. Subsequently, the heat source was as deactivated, and the reactor vessel was allowed to cool to a temperature of 30–35 deg. C. The agitator motion was arrested, and the vessel opened.

In accordance with the methods described above and those used for Example C 1, the emulsion was evaluated and the results are described in Table C 1.

EXAMPLE C3

To the reaction product according to Example C2 was added a quantity of dilute hydrochloric acid at an approximate concentration of 10% to adjust the pH of the emulsion to have a value of 4.9 and to evaluate any change in the optical and physical qualities of the emulsion. These test results are outlined on Table C 1.

EXAMPLE C4

The reactor vessel was charged with Varonic T-202, Igepal CO-430, acetic acid, sodium chloride, and water in the proportions outlined in Table C1. The reactor vessel was sealed and the agitator was energized to assure thorough mixing, and the reaction vessel was heated to 25 deg. C. and at a constant temperature of 25 deg. C., the contents stirred for a period of 15 minutes. Afterwards, the reactor vessel was opened, and approximately 5 milliliters (5 ml) of dilute (approx. 10% conc.) hydrochloric acid was added to adjust the pH from a value of 5.7 to a value of 4.75. Afterwards, the amounts of Dow Corning® CSF and A-C®-629 were added. the reactor vessel sealed and represented, agitation reinserted and the vessel was heated at a rate of 1 deg. C. per minute from an initial starting temperature of 90 deg. C. to 110 deg. C., and upon reaching 110 deg. C., the temperature was maintained within the range of 110–111 deg. C. for a period of 15 minutes. Subsequently, heat was terminated and the reactor and it contents were cooled to a temperature of 30–35 deg. C. The reactor vessel was opened and the reaction products were tested. The results are indicated on Table C 1.

EXAMPLE C5

To the emptied and cleaned reaction vessel were introduced the quantities of Ethomeen T-12, Igepal CO430, acetic acid and water as indicated on Table C1. The reactor was sealed and the agitator activated to assure thorough stirring. Heat was supplied to the reactor and its contents to raise the temperature to 100 deg. C. after which the heat was removed and the reactor was allowed to cool. The agitator was halted, and the vessel opened in order to add approximately 5.4 grams of concentrated hydrochloric acid so to adjust the acididity of the reaction mixture from a pH of 5.7 to a pH of 4.95. Subsequently, the quantities of A-C® 629 and the Dow Corning® CSF were added to the reaction mixture, the reactor then sealed and repressurized and the agitator restarted. The reactor was then reheated to 110 deg. C. from an initial starting temperature of approximately 90 deg. C. at a rate of temperature rise of 1 deg. C. per minute of time. Upon reaching 110 deg. C., the reactor was retained at this constant temperature for a C. per minute of time. Upon reaching 110 deg. C., the time interval of 1 minute, after which the heat source was removed, and the reactor allowed to cool. Upon reaching a temperature of approximately 30–35 deg. C., the agitator was halted, and the reactor was opened. The resulting reactant mixture was observed to produce a slightly milky film when tested upon a glass laboratory slide. To the reaction mixture was added 0.25 grams of the sodium metabisulfite, after which the reactor was sealed, repressurized, reagitated and reheated to raise the temperature to 115 deg. C. Upon reaching this temperature the heat was removed, and the reactor was allowed to cool to approximately 30–35 deg. C. The agitator was halted, and the reactor was opened and to the reaction mixture was added an additional 0.5 grams of sodium metabisulfite, after which the reactor was sealed, repressurized, reagitated and reheated to raise the temperature to 115 C., upon which the heat was removed and the reactor allowed to cool to a temperature of approximately 30–35 deg. C. The resultant emulsion was tested and found to have a pH value of 4.85, and to be milky in appearance.

EXAMPLE C6

To the reactor was added all of the individual constituents as outlined in Table C1 except for the sodium hydroxide. The reactor was sealed and the electric motor was energized in order to drive the agitator. The contents of the reactor were stirred for one hour (1 hr) at a constant temperature of 25 deg. C. Subsequently, heat was supplied to the reactor contents to raise the temperature to 90–95 deg. C. at a first rate of approximately 2 deg. C. per minute, and then the heat was reduced to a second rate of approximately 1 deg. C per minute to raise the reactor contents from 90–95 deg. C. to 110 deg. C. Then, the heat was limited to maintain the reactor contents within a temperature range of 110–112 deg. C. for a period of ten minutes (10 min.), after which the heat was removed, and the contents cooled to a temperature of approximately 30–35 deg. C. The agitator was then halted, and the reactor was opened, at which point was added 0.2 grams of sodium hydroxide in the form of pellets of 90% concentration to the reaction mixture, after which the reactor was sealed, repressurized, reagitated and reheated to raise the temperature to 110 deg. C., upon which the heat was once again removed and the reactor allowed to cool to a temperature of approximately 30–35 deg C. The resultant emulsion was tested with the results indicated on Table C1.

EXAMPLE C7

To the reactor vessel was introduced the AC-629, Igepal CO-430, and sodium hydroxide in the proportions outlined in Table C1, to which was added 304.4 ml of water Afterwards was added to the reactor vessel a mixture of the acetic acid, and 1 gram of concentrated hydrochloric acid, (3% conc.) in 210 ml of water. The reactor was then sealed and the agitator activated to assure thorough stirring. Heat was supplied to the reactor and its contents to raise the temperature to 105–110 deg. C., and maintained for ten minutes within that temperature range, after which the heat was removed and the reactor was allowed to cool. The heat was then terminated and the reactor and it contents were cooled to a temperature of 30–35 deg. C. The reactor vessel was opened and the reaction products were tested, with the results indicated on Table C1.

EXAMPLE C8

To the reaction mixture according to Example C7 was further added an additional 1.0 grams of concentrated hydrochloric acid, (37% conc.). The reactor was then sealed and the agitator activated to assure thorough stirring. Heat was supplied to the reactor and its contents to raise the temperature to 110 deg. C., and then maintained for one minute within that temperature range, after which the heat was removed and the reactor was allowed to cool. The heat was then terminated and the reactor and it contents were cooled to a temperature of 30–35 deg. C. The reactor vessel was opened and the reaction products were tested, with the results indicated on Table C 1.

EXAMPLE C9

To the reaction mixture according to Example C8 was further added an additional 1.2 grams of concentrated hydrochloric acid, (37% conc.). The reactor was then sealed and the agitator activated to assure thorough stirring. Heat was supplied to the reactor and its contents to raise the temperature to 110 deg. C., and then maintained for one minute within that temperature range, after which the heat was removed and the reactor was allowed to cool. The heat was then terminated and the reactor and it contents were cooled to a temperature of 30–35 deg. C. The reactor vessel was opened and the reaction products were tested, with the results indicated on Table C1.

EXAMPLE C10

The constituents listed on Table C1 were introduced to the reaction vessel, and the vessel was subsequently sealed and the agitator initiated. Subsequently, the temperature of the vessel was raised from 22 deg. C. to 75 deg. C. at a first rate of 2–5 deg. C per minute. and then from 75 deg. C. at a second rate of 1 deg. C. per minute. to a temperature within the range of 104–108 deg. C. Thereafter, the temperature of the reactor contents was maintained in the range of 104–108 deg. C. for a period of ten minutes (10 min.), after which time heating of the reactor was terminated and the reactor allowed to cool to 30–35 deg. C. The emulsion was evaluated and result are listed on Table C1.

EXAMPLE C11

The constituents as listed on Table C1 were charged into the reaction vessel, after which the vessel was subsequently sealed and the agitator activated. Subsequently, the temperature of the vessel as raised from approximately 20 deg. C. to a temperature range of 78–80 deg. C. at a first rate of 2–4 deg. C. per minute, and then maintained from 75 deg. C. within the temperature range of 78–80 deg. C. for a period of approximately 45 minutes. Afterwards, the temperature of the reaction mixture was further elevated at a second rate of 1 deg C. per minute, to a temperature within the range of 104–108 deg. C. Thereafter, the temperature of the reactor contents was maintained in the range of 104–108 deg. C. for a period of ten minutes (10 min.), after which time heating of the reactor was terminated and the reactor allowed to cool to 30–35 deg. C. The emulsion was evaluated and result are listed on Table C1, with higher Klett values being observed.

EXAMPLE C12

To the reactor was added all of the individual constituents. including an A-C® 629 constituent having an acid value of 16.2 as outlined in Table C1, after which the reactor was sealed and the electric motor was energized in order to drive the agitator. The contents of the reactor were then rapidly heated to 78 deg. C. at a first rate of approximately 2 deg. C. per minute, and then the heat was reduced to a second rate of approximately 1 deg. C. per minute to raise the reactor contents from 78 deg. C. to a temperature in the range of 104–108 deg. C. Then, the heat was controlled to maintain the reactor within a temperature range of 104–108 deg. C. for a period of ten minutes (10 min). after which the heat was removed, and the contents cooled to a temperature of approximately 30–35 deg. C. The agitator was then stopped, and the reactor was opened. The resultant emulsion was tested with the results indicated on Table C1.

EXAMPLE C13

The procedure used in Example C12 was replicated. with the substitution of one constituent, the A-C® 629 with an acid value of 15.9. The resultant emulsion Was tested with the results indicated on Table C1. An increase in the Klett value was observed.

EXAMPLE C14

To the reactor was added all of the individual constituents as outlined in Table C1, which included a quantity of ammonium hydroxide. Subsequently, the reactor was sealed and the electric motor was energized in order to drive the agitator. The contents of the reactor were stirred for fifteen minutes (15 min) at a constant temperature of 27 deg. C. Subsequently, heat was supplied to the reactor contents to raise the temperature to 75 deg. C. within a first time interval of twenty minutes (20 ) min.) which was an first average rate of temperature rise of 2.4 deg. C. per minute. Afterwards, the rate of heating was reduced, and the temperature of the reactor was allowed to rise for a further time interval of approximately thirty-three minutes (33 min.) which was a second average rate of temperature rise of 1 deg. C. per minute. When the reactor contents reached 104 deg. C. the heat was reduced and controlled so to maintain the reactor contents within a temperature range of 104–109 deg. C for a period of ten minutes (10 min), after which the heat was removed, and the contents cooled rapidly by immersion into a water bath at a temperature of 20–25 deg. C. to a temperature of approximately 30–35 deg. C. The resultant emulsion was tested with the results indicated on Table C1.

EXAMPLE C15

The procedure used in Example C14, was replicated. using the constituents outlined in Table C 1. The resultant emulsion was tested with the results indicated on Table C1. A slight increase in the Klett value was observed.

EXAMPLE C16

In this example, the coemulsification of a high density oxidized polyethylene and an aminosilicone oil was performed. The constituents denoted on Table C1 were introduced into the reactor, which was sealed and the constituents stirred at a temperature of 25 deg. C for a period of one hour. The temperature of the constituents was raised in accordance with the following temperature rise profile: at initialization of heating, 25 deg. C; at 30 minutes, 100 deg. C; at 45 minutes, 124 deg. C; at 55 minutes, 129 deg. C; at 60 minutes, 133 deg. C; at 62 minutes, 35 deg. C; at 72 minutes, 138 deg. C., at which point the heat was removed, and the reactor cooled by immersion in a water bath at room temperature. When cooled, the reactor was opened and a glass laboratory slide was immersed into the reaction mixture. The reaction mixture appeared to be clear, with moderately sized particles therein. The reactor was resealed, and the reaction mixture reheated in accordance with the following profile: at initiation of heating, 29 deg. C; at 20 minutes, 115 deg. C; at 40 minutes, 136 deg. C; at 44 minutes, 141 deg. C; at 49 minutes, 141 deg. C; upon which the heat was removed and the reactor cooled in a water bath. The product coemulsion was evaluated with the results are denoted on Table C 1.

EXAMPLE C17

A further coemulsification of a high density oxidized polyethylene in combination with an amino-silicone oil was produced. The constituents denoted on Table C1 were placed into the reactor which was sealed, stirred and heated in accordance with the following process steps. The constituents were stirred for 45 minutes at a temperature of 27–28 deg. C. and then heated in accordance with the following profile: At the initiation of heating, the temperature was 27 deg. C; at 35 minutes, 112 deg. C; at 69 minutes, 130 deg. C; at 76 minutes, 141 deg. C; at 80 minutes, 145 deg. C; at 86 minutes, 144 deg. C., at which point the heat was removed and the reactor cooled in a water bath. The resultant coemulsion was evaluated and the results are listed on Table C1.

EXAMPLE C18

A yet further coemulsification of a high density oxidized polyethylene in combination with an amino-silicone oil was produced. The constituents denoted on Table C1 were placed into the reactor which was sealed, stirred and heated in accordance with the following process steps. The constituents were first stirred within the sealed reactor for 10 minutes at a temperature of 24–29 deg. C. and then heated in accordance with the followmg profile: At the initiation of heating, the temperature was 29 deg. C; at 27 minutes, 100 deg. C; at 45 minutes, 120 deg. C; at 54 minutes, 130 deg. C; at 64 minutes, 141 deg. C; at 74 minutes, 144 deg. C., at which point the heat was removed and the reactor cooled m a room temperature water bath. The resultant coemulsion was evaluated and found to be good, and the results are listed on Table C1.

EXAMPLE C19

A coemulsification of a low density polyethylene and having higher acid values than used in prior Examples was formed. The constituents noted on Table C1 were introduced into the reactor which sealed and the reactants sirred with the constituents remaining at 26 deg. C. or a period of 15 minutes. The reactor was then heated in accordance with the following temperature profile: at initiation of heating 26 deg. C; at 39 min., 90 deg. C; at 45 min., 100deg. C; at 49 min., 104 deg. C; at 55 min., 106 deg. C; at 59 min, 105 deg. C., at which point the heal was removed and the reactor and contents cooled in an ambient temperature water bath having a temperature of between 20–30 deg. C. When the reactor contents reached a temperature of 35 deg C., the reactor was opened and the resulting coemulsion evaluated. The results are denoted on Table C1.

EXAMPLE C20

The coemulsification process of Example C19 was repated with the same constituents used in forming Example C19, with the variation that additional ammonia was introduced to the initial constituent mixture in order to evaluate the effects on the acidity of the polyethylene and its effects on the coemulsification process and the coemulsion. The resultant coemulsion was evaluated. and the results denoted on Table C1.

EXAMPLE C21

Constituents comprising a low density polyethylene with an different acid number then previously utilized and listed on Table C1 were introduced into the reactor which was sealed and the reactants stirred with the constituents remaining at 24–26 deg. C. over a period of 15 minutes. The reactor was then heated in accordance with the following temperature profile: at initiation of heating, 26 deg. C; at 26 min., 101 deg. C; at 31 min., 1 deg. C: at 39 min., 104 deg. C; at which point the heat was removed and the reactor with contents cooled in an ambient temperature water bath having a temperature of between 20–30 deg. C. When the reactor contents reached a temperature of approximately 35 deg. C., the reactor was opened and the resulting coemulsion evaluated. The results are denoted on Table C1.

EXAMPLE C22

A coemulsion was prepared in a two-step process where an initial "pre-coemulsion" material was produced, followed by subsequent formation of the coemulsion using the pre-coemulsion material.

Into the reactor was introduced a 128 grams of A-C ® 629 low molecular weight polyethylene having an acid value of 15.7, and 32 grams of Dow CSF amino siloxane. The reactor was sealed and the constituents stirred, during which the temperature of the constituents was raised to 112 deg. C., to assure the melting of the polyethylene and thereafter maintained at that temperature for 5 minutes, subsequent to which the reactor and its contents were cooled. The reactor contents appeared as a hard waxy material of homogeneous nature, and was a beige color. This material formed the pre-coemulsion material.

In the next step, to the pre-coemulsion material was added the remaining constituents as outlined on Table C1 and the reactor was then sealed, stirring was initiated, and the reactor was then heated in accordance with the following temperature profile: at initiation of heating, 24–26 deg. C., after which the constituents were heated to 104 deg. C., at which point the constituents were retained in the temperature range of 104–115 deg. C. for a nine interval of 10 minutes. Afterwards, heat was removed and the reactor was cooled in an ambient temperature water bath having a temperature of between 20–30 deg. C. When the reactor contents reached a temperature of approximately 35 deg. C., the reactor was opened and the resulting coemulsion evaluated. The results are denoted on Table C1. The resultant coemulsion was somewhat cloudy in appearance, and was observed to contain particles.

EXAMPLE C23

As in Example C22 a further coemulsion was prepared in a two-step process. The quantities of the materials used are denoted on Table C1.

Into the reactor was introduced a quantity of A-C® 629 low molecular weight polyethylene having an acid value of 15.7, which was introduced onto the reactor which was then heated to 105 deg. C. in order to melt the polyethylene, and once melted, the Dow CSF amino siloxane was poured onto the reactor. Immediate thickening of the mixture was noted, and subsequently the mixture was poured from the reactor into an aluminum tray within which the mixture, which is the pre-coemulsion material, solidified.

In the next step, to the pre-coemulsion material was first broken down by crumbling into small pieces, and introduced into the reactor, after which the remaining constituents as outlined on Table C1 were added. The reactor was then sealed, stirring was initiated, and the reactor was then heated in accordance with the following temperature profile: at initiation of heating, 24–26 deg. C., after which the constituents were heated rapidly to 92 deg. C., then more slowly so that after 19 minutes the temperature rose to 104 deg. C., and after a further 10 minutes, the temperature rose only to 108 deg. C., thereby maintaining the constituents for a time interval of 10 minutes in a temperature range between 104–108 deg. C. Afterwards, heat was removed and the reactor was cooled in an ambient temperature water bath having a temperature of between 20–30 deg. C. When the reactor contents were sufficiently cooled, the reactor was opened and the resulting coemulsion evaluated. The results are denoted on Table C1. The resultant coemulsion was somewhat cloudy in appearance, and was observed to contain particles.

EXAMPLE C24

To the reactor was added all of the individual constituents as outlined in Table C 1, after which the reactor was sealed and the electric motor was energized in order to drive the agitator. The contents of the reactor were then rapidly heated from a temperature of approximately 24 deg. C. to 90 deg. C. at a first rate of approximately 2 deg. C. per minute, and then the heating rate was maintained at a reduced second rate of approximately 1 deg. C. per minute to raise the reactor contents from 90 deg. C. to 104 deg. C. Subsequently, the temperature was maintained in the range of 104–108 deg. C. for a period of 10 minutes. Then, the heat was removed. and the contents cooled to a temperature of approximately 30–35 deg. C. The agitator was then stopped. and the reactor was opened. The resultant emulsion was observed to produce a clear slide, and further with the results indicated on Table C1.

EXAMPLE C25

As in Examples C22 and C23 a further coemulsion was prepared in a two-step process. The quantities of the materials used are denoted on Table C1.

Into the reactor was introduced a quantity of A-C® 629 low molecular weight polyethylene having an acid value of 15.7. which was then heated to 125 deg. C. in order to melt the polyethylene, and once melted, the potassium hydroxide (KOH) in the form of flakes of 87% concentration was commixed with water and added to the reactor containing the polyethylene. After five minutes, to the reactor was further added the CSF amino siloxane uhich was poured onto the reactor at which time it was observed that the constituents were thickening. The agitation was continued for a further 1–2 minutes, after which the agitator was halted and the constituents which form the pre-coemulsion material was poured into a try and allowed to solidify. The solidified material appeared to be waxy, and yellowish in color.

In the next step, to the pre-coemulsion material was removed from the tray, and after being first broken down by crumbling into small pieces, reintroduced into the reactor, after which the remaining constituents as outlined on Table C1 were added. The reactor was then sealed, stirring was initiated, and the reactor was then heated in accordance with the following temperature profile: at initiation of heating, 24–26 deg. C., after which the constituents were heated rapidly to 76 deg. C.. then more slowly at a rate of 1 deg. C/min. from 76 deg. C. to 104 deg. C., at which time the heat was controlled so to maintain the temperature in the range of 104–110 deg. C. for 10 minutes. Afterwards, the heating means was removed and the reactor was cooled in an ambient temperature water bath having a temperature of between 20–30 deg. C. When the reactor contents were sufficiently cooled, the reactor was opened and the resulting coemulsion evaluated. The results are denoted on Table C1. The resultant coemulsion did reveal a few large wax particles which were trapped on the surface and had not melted, however the balance of the coemulsion formed was observed to be only slightly cloudy in appearance, and otherwise no particles could be observed.

EXAMPLES K1–K13

Further samples having the overall compositions outlined in Table KS-1 were prepared in general accordance dance with the apparatus and the procedure outlined above for samples C10–C15.

TABLE KB-1

| Material | K1 | K2 | K3 | K4 | K5 | K6 | K7 | K8 | K9 | K10 | K11 | K12 | K13 |
|---|---|---|---|---|---|---|---|---|---|---|---|---|---|
| A-C 629 | 32 | 32 | 32 | 32 | 32 | 32 | | | 34 | 34 | | | |
| A-C 329 | | | | | | | 32 | 32 | | | 34 | 34 | 34 |
| Dow CSF | 8 | 8 | 8 | 8 | 8 | | 8 | 8 | 6 | 6 | 6 | 6 | 6 |
| Dow SSF | | | | | | | | | | | | | |
| Union Carbide Magnasoft | | | | | | 8 | | | | | | | |
| Ethomeen T-12 | 12.8 | 12.8 | 12.8 | 12.8 | 12.8 | 12.8 | | | 12.8 | 13 | | | |
| Ethomeen 18/12 | | | | | | | 12 | 12 | | | 12 | 12 | 12 |
| Igepal CO-430 | | 3.2 | 3.2 | 3.2 | 3.2 | | 4 | 4 | | | 4 | | |
| Varonic T-202 | | | | | | | | | | | | | |
| Tergitol 15-8-3 | | 3.2 | | | | 3.2 | | | | | | | 4 |
| Ethal TDA-3 | | | 3.2 | | | | | | 3.2 | 3 | | | |
| glacial acetic acid | 1.8 | 1.8 | 1.8 | 1.8 | 1.8 | 2.4 | 4.13 | 3.5 | 1.8 | 2 | 3.5 | 3.5 | 3.5 |
| hydrochloric acid, 10% | | | | | | | | | | | | | |
| sodium chloride | | | | | | | | 0.4 | | | 0.4 | 0.4 | 0.4 |
| sodium metabisulfite | | | | | | 0.32 | 0.4 | | | | | | |
| water | 128.6 | 128.6 | 128.6 | 128.6 | 128.6 | 128.6 | 166 | 128.1 | 128.6 | 128.6 | 128.1 | 128.1 | 128.1 |
| composition pH | 4.87 | 5.03 | 4.9 | 4.8 | 4.97 | 4.77 | 4.51 | 4.77 | 5.1 | 4.05 | 5.15 | 5.1 | 5.12 |
| Klett value | 185 | 290 | 310 | 330 | 345 | 365 | 465 | 460 | 295 | 240 | 350 | 370 | 395 |
| optical density | 0.37 | 0.58 | 0.62 | 0.66 | 0.69 | 0.73 | 0.93 | 0.92 | 0.59 | 0.5 | 0.7 | 0.74 | 0.79 |
| light trans, % | 42.7 | 26.31 | 24 | 231.9 | 20.43 | 18.64 | 11.76 | 12.05 | 25.74 | 31.64 | 20.93 | 18.2 | 16.23 |
| slide appearance | clear | clear | clear | clear | cloudy | cloudy | clear | clear | clear | clear | clear | clear | clear |

The concentration of the materials were varied in the percentages outlined. Results listing the acidity and the optical qualities of the sample are listed.

EXAMPLES P1–P8

In order to determine the dynamic coefficient of friction, or "COF" of the inventive compositions as used with a paper substrate, compositions designated P1–P8 as outlined in Table PS-1 were produced in accordance with the general methods used for the production of examples C1–C15.

TABLE PS-1

| Material | P1 | P2 | P3 | P4 | P5 | P6 | P7 | P8 |
|---|---|---|---|---|---|---|---|---|
| A-C 629 | | | | 34 | 32 | | 176 | |
| A-C 329 | | 34 | 32 | | | 176 | | |
| Dow CSF | | 6 | 8 | 6 | 8 | | | |
| Dow SSF | | | | | | | | |
| Union Carbide Magnasoft | | | | | | | | |
| Ethomeen T-12 | | | | 12 | 12.8 | | | |
| Ethomeen 18-12 | | 12 | 12 | | | | | |
| Igepal CO-710 | | | | | | 44 | 44 | |
| Igepal CO-430 | | 4 | 4 | | | | | |
| Varonic T-202 | | | | | | | | |
| Tergitol 15-8-3 | | | | | | | | |
| Ethal TDA-3 | | | | 3 | 3.2 | | | |
| glacial acetic acid | | 3.5 | 3.5 | 2 | 1.8 | | | |
| hydrochloric acid, 10% | | | | | | | | |
| sodium chloride | | 0.4 | 0.4 | | | | | |
| sodium metabisulfite | | | | | | 1.76 | | |
| potassium hyroxide | | | | | | 3.78 | 3.78 | |
| water | 128.1 | 128.1 | 128.1 | 128.6 | 128.6 | 224.4 | 526 | 533 |
| composition pH | | 5.05 | 5.1 | 5.1 | 5.2 | 9.2 | 9.5 | |
| Klett value | | 295 | 290 | 240 | 224 | 55 | 210 | |
| optical density | | 0.59 | 0.6 | 0.48 | 0.44 | 0.11 | 0.42 | |
| light trans, % | | 25.7 | 25.1 | 33.15 | 35.5 | 77.6 | 38 | |
| slide appearance | | clear | clear | clear | clear | clear | clear | |

For comparative purposes, four compositions were formulated as control samples for the purpose of comparison. These included: sample P5 which was a amino silicon control; sample P6 which comprised low density polyethylene; sample P7 which comprised high density polyethylene; and sample P8 which was a paper control blank having no lubricant coating. The paper substrate was Westvaco Sterling II Litho Gloss, a web offset paper having an 80# weight rating. Compositions P1–P8 were all coated onto the paper using a wire wound #6 draw down rod, which gave a 0.54 mil wet film thickness. All of the compositions were applied at a 30% non-volatile level to ensure consistent and equal film deposition.

The evaluation of each of the compositions was performed under two different contact situations: "coated/coated" and "coated/uncoated". What is meant by "coated/coated" is two contacting faces of the paper substrate used in any particular evaluation were coated with a particular composition so that a measure of the dynamic coefficient of friction of the two coated faces could be evaluated. In a similar manner, what is meant by "coated/uncoated" is that one of two contacting faces of the paper substrate used in an evaluation was coated with a composition so to provide a measure of the dynamic coefficient of friction of one coated face against a non-coated or "neat" face of paper could be determined. The coefficient of friction was determined by the use of a "Coefficient of Friction Tester" Model No. 32–25 produced by Testing Machines. Inc. This device includes an reclining board with a weighted sled and measures the angle, at which the individual coated substrates allowed the weighted sled to move. The tangent value of this angle is used as the COF for any test.

Test results for each of the compositions P1–P8 were determined for both "coated/coated" and "coated/uncoated" evaluations from four individual testing trials of each. The results from each of the four trials for a particular composition were averaged to determine the dynamic COF values the results of which are reported in Table PS-2 below.

TABLE PS-2

| | Coefficients of Friction (Dynamic) | |
|---|---|---|
| Example Composition: | Coated/Coated | Coated/Uncoated |
| P2 | 0.2878 | 0.1899 |
| P3 | 0.2171 | 0.1944 |
| P4 | 0.275 | 0.2633 |
| P5 | 0.2173 | 0.2633 |
| P6 | 0.2726 | 0.2424 |
| P7 | 0.4898 | 0.4117 |
| P8 | 0.2856 | 0.2679 |
| PC1 | (Uncoated/Uncoated) = 0.337 | |

As may be seen from these test results. the resulting COF values as determined for the coemulsion compositions, whether such coemulsions utilized low density or high density polyethylenes in their formulations provided generally improved values in the reported performance characteristics as compared to compositions of emulsions having only a single constituent. This may be particularly seen in conjunction with the results of associated with compositions P2 and P3.

The compositions were tested in conjunction with fiber and fabric (textile) samples in order to evaluat the effects of the use of the compositions. Fabric samples were evaluated by treating samples of a 65/35 polyester/connon filter cloth where each of the fabric samples was a panel of dimensions 14.5 inches by 18 inches. The fabric samples were prepared by separately treating each within a fluid bath which contained one of the compositions labeled as T1–T16 whose compositions are described on Table TS-1 below.

TABLE TS-1

| Material | T1 | T2 | T3 | T4 | T5 | T6 | T7 | T8 | T9 | T10 | T11 | T12 | T13 | T14 | T15 | T16 |
|---|---|---|---|---|---|---|---|---|---|---|---|---|---|---|---|---|
| A-C 629 | | | | 34 | 32 | | 176 | | | | | 34 | 32 | | 176 | |
| A-C 329 | | 34 | 32 | | | 176 | | | | 34 | 32 | | | 176 | | |
| Dow CSF | | 6 | 8 | 6 | 8 | | | | | 6 | 8 | 6 | 8 | | | |
| Dow SSF | | | | | | | | | | | | | | | | |
| Union Carbide Magnasoft | | | | | | | | | 159 | | | | | | | 160 |
| Ethomeen T-12 | | | | 12 | 12.8 | | | | | | | 12 | 12.8 | | | |
| Ethomeen 18-12 | | 12 | 12 | | | | | | | 12 | 12 | | | | | |
| Igepal CO-710 | | | | | | 44 | 44 | | | | | | | 44 | 44 | |
| Igepal CO-430 | | 4 | 4 | | | | | | | 4 | 4 | | | | | |
| Varonic T-202 | | | | | | | | | | | | | | | | |
| Tergitol 15-8-3 | | | | | | | | | | | | | | | | |
| Ethal TDA-3 | | | | 3 | 3.2 | | | | | | | 3 | 3.2 | | | |
| glacial acetic acid | | 3.5 | 3.5 | 2 | 1.8 | | | | | 3.5 | 3.5 | 2 | 1.8 | | | |
| hydrochloric acid, 10% | | | | | | | | | | | | | | | | |
| sodium chloride | | 0.4 | 0.4 | | | | | | | 0.4 | 0.4 | | | | | |
| sodium metabisulfite | | | | | | 1.76 | | | | | | | | 1.76 | | |
| potassium hydroxide | | | | | | 3.78 | 3.78 | | | | | | | 3.78 | 3.78 | |
| water | 128.1 | 128.1 | 128.1 | 128.6 | 128.6 | 224.4 | 528 | 533 | 530 | 128.1 | 128.1 | 128.6 | 128.6 | 224.4 | 528 | 533 |
| composition pH | | 5.05 | 5.1 | 5.1 | 5.2 | 9.2 | 9.5 | | | 5.05 | 5.1 | 5.1 | 5.2 | 9.2 | 9.5 | |
| Klett value | | 295 | 290 | 240 | 224 | 55 | 210 | | | 295 | 290 | 240 | 224 | 55 | 210 | |
| optical density | | 0.59 | 0.6 | 0.48 | 0.44 | 0.11 | 0.42 | | | 0.58 | 0.6 | 0.48 | 0.44 | 0.11 | 0.42 | |
| light trans, % | | 25.7 | 25.1 | 33.15 | 35.6 | 77.6 | 38 | | | 25.7 | 25.1 | 33.15 | 36.7 | 77.6 | 38 | |
| slide appearance | | clear | clear | clear | clear | clear | clear | | | clear | clear | clear | clear | clear | clear | |

These fluid baths are well known to the textile processing art, and typically comprise a major proportion of water, and minor proportions of other additives such as softening agents, various resins, including permanent press resins, as well as other desired constituents which are useful in the treatment of textiles.

With regard to these samples, sample T1 was a control sample consisting of water with no further additives, samples T2–T5 were samples comprising coemulsions according to the invention and amino silicone, samples T6–T8 were additional comparative samples of various emulsions, sample T9 was a comparative example which included a blend of water and a durable press resin. "Reactex LFF" which is described as a self-catalyzed glyoxal based material which is used as a permanent press finishing agent and features low formaldehyde shrinkage control, which is commercially available from Ivax Industries, samples T10–T13 were samples P comprising coemulsions according to the invention and amino silicone, and further included the durable press resin, samples T14-T16 were further examples with various emulsions. The emulsions were prepared in a manner similar to the methods used for the production of examples which are outlined on Table C1 noted above. The individual samples were contacted to the fabric by methods known to the art, so that the fabric had a 56% wet pick-up of the fluid and each of the individual samples were evaluated for the following physical characteristics: tensile strength according to the AATCC. test protocol, "hand" using a four point scale, wherein a value of 1 is indicative of superior "hand" characteristics, and a value of 4 is indicative of poor "hand" characteristics. "Hunter whiteness", wrinkle recovery according to the AATCC test protocol, the Stoll flex in both the warp and fill directions of the fabric samples, and the tear strength in both the warp and fill directions of the fabric samples. The results of the testing of the fabric samples utilizing the compositions described on Table TS-1 is outlined on Table TS-2 below.

TABLE TS-2

| Sample | Tensile Str. in lbs | Hand | Hunter Whiteness | Wrinkle recovery | Stoll Flex (warp/THI) | Tear Strength (warp/THI) | Needleburn |
|---|---|---|---|---|---|---|---|
| T1 | 44 | 2 | 126 | 264 | 625/375 | 3.4/2.6 | clogged |
| T2 | 41 | 1 | 123 | 274 | 3750/2450 | 5.8/4.4 | clean |
| T3 | 40 | 1 | 124 | 272 | 6350/3360 | 5.7/4.4 | clean |
| T4 | 42 | 1 | 123 | 270 | — | 5.4/4.3 | clean |
| T5 | 42 | 1 | 123 | 272 | 5700/3300 | 5.3/4.3 | clean |
| T6 | 42 | 1 | 124 | 278 | 5000/4300 | 5.6/4.1 | clean |
| T7 | 42 | 2 | 122 | 265 | 2350/1150 | 4.9/4.2 | clean |
| T8 | 36 | 2 | 123 | 266 | 1250/1150 | 6.3/4.1 | clean |
| T9 | 47 | — | 128 | 294 | 1280/325 | 3.4/2.1 | partial clog |
| T10 | 44 | — | 123 | 293 | 5600/3100 | 5.1/3.6 | clean |
| T11 | 42 | — | 125 | 302 | 6500/3100 | 5.1/3.7 | clean |
| T12 | 43 | — | 124 | 299 | 4850/2650 | 4.5/3.3 | clean |
| T13 | 42 | — | 124 | — | 3500/1650 | 4.6/3.1 | clean |
| T14 | 40 | — | 128 | 304 | 6500/2850 | 5.0/3.9 | clean |
| T15 | 44 | — | 128 | 289 | 2700/2050 | 4.7/3.2 | clean |
| T16 | 40 | — | 194 | 307 | 2080/1650 | 5.5/4.1 | clean |

As may be seen from the results on Table TS-2 the compositions utilizing the coemulsions all show tensile strength properties. Hunter Whiteness values, and wrinkles recovery values which are comparable to the samples of a single constituent emulsion, namely T6–T8, T14–T16. A striking improvement in the hand is to be noted for compositions T2–T6 which comprise the coemulsions, as well as modest to marked improvements in the Stoll Flex characteristics of the fabric samples treated with the coemulsions as compared to the results observed for emulsions containing a single constituent, namely T6–T8, and T1–T16.

The compositions denoted as T1–T16 were also evaluated in conjunction with a fabric panels of 65%/35% polyester/cotton fiber cloth in order to evaluate the needleburn characteristics of the treated fabric panels. The fabric panels were prepared in accordance with the fabric panels listed on Table TS-1. The lubricated fabric panels were tested using 16/1 needles on a Singer model 282 sewing machine operating at a rate of 5000 stitches per minute running through 4 folds of fabric through 4 passes. The observed characteristics from this testing procedure are noted on Table TS-2. As may be seen from these results, the needle remained clean through all of the samples except for the two control compositions, T1 and T9 which contained no emulsion.

It can be seen by the foregoing that the coemulsions according to the instant invention provide compositions useful as processing aid for for improving fabric, thread and paper processing characteristics, particularly in improving the "hand", of textiles treated with the coemulsions taught herein, which provide such improved characteristics with relatively small amounts of amino functional silicone softeners in conjunction with other constituents. Such an advance allows for a more cost efficient use of such silicone containing constituents with no compromise in performance characteristics, but rather a surprising improvement in key properties of the materials with which the coemulsion is used.

It will be appreciated that the instant specification and the examples set forth are by way of illustration and not by limitations, and that various modifications and changes may be made to the teachings presented herein, and that various modifications and changes may be made without departing from the spirit and scope of the present invention and are to be considered a part thereof, said invention being limited only by the following claims.

We claim:

1. An article which includes a substrate being at least partially coated with a coating of a composition comprising:

a coemulsion which includes;

at least one oxidized polyethylene, and at least one amino functional silicone.

2. The article of claim 1 wherein the polyethylene of the composition is selected from the group consisting of:

polyethylene homopolymers, polyethylene/acrylate copolymers, polyethylene terpolymers containing acrylates, and polyethylene terpolymers containing esters.

3. The article of claim 1 wherein the polyethylene is an oxidized high density polyethylene.

4. The article of claim 1 wherein the polyethylene is an oxidized low density polyethylene.

5. The article of claim 1 wherein the composition further comprises:

at least one constituent selected from the group consisting of:

ethoxylated aliphatic amines,
ethoxylated octylphenols,
ethoxylated nonylphenols,
ethoxylated primary alcohols,
ethoxylated secondary alcohols, and
nonionic emulsifiers.

6. The article of claim 1 wherein the composition further comprises:

at least one constituent selected from the group consisting of:

a fatty acid,
ammonium hydroxide, and
sodium salts.

7. The article of claim 6 wherein the sodium salts of the composition are selected from the group consisting of:

sodium chloride, sodium hydroxide, and sodium metabisulfite.

8. The article of claim 1 wherein the amino functional silicone is a polydiorganosiloxane.

9. The article of claim 8 wherein the polyorganosiloxane has an amine neutral equivalent in the range of between about 1000 and 3000.

10. The article of claim 5 wherein the ethoxylated aliphatic amine are the reaction products of a saturated or unsaturated fatty amines reacted with ethylene oxide.

11. The article of claim 5 wherein the composition includes a condensation product of ethylene oxide with a hydrophobic material selected from the group consisting of: a long chain aliphatic alcohol, an ester, an acid, an ether, and an alkyl phenol.

12. The article of claim 5 wherein the composition includes a tallowamine.

13. The article of claim 1 wherein the composition further includes at least one reagent selected from the group consisting of: acetic acid, hydrochloric acid, and ammonium hydroxide.

14. A process for producing an article including a substrate having a coating of a composition comprising a coemulsion, said coemulsion which includes:

at least one oxidized polyethylene, and at least one amino functional silicone which includes the process steps of:

providing the oxidized polyethylene and the amino functional silicone to a reaction vessel, raising the temperature of the oxidized polyethylene and amino functional silicone to at least the melt point of the oxidixed polyethylene constituent, and, ultimately contacting said substrate with said composition.

15. The process of claim 14 wherein the step of raising the temperature of the oxidized polyethylene and amino functional silicone to at least the melt point of the oxidixed polyethylene constituent comprises the further process steps of:

raising the temperature of the the melt point of the oxidized polyethylene constituent to a maximum temperature, followed by maintaining the constituents at this maximun temperature for a first residence time interval.

16. The process of claim 14 wherein the step of raising the temperature of the oxidized polyethylene and amino functional silicone to at least the melt point of the oxidixed polyethylene constituent comprises the further process steps of:

applying heat at a first heating rate to a first intermediate temperature and then heating the constituents from the first intermediate temperature to a second, maximum temperature at a second heating rate.

17. The process of claim 17 wherein the first heating rate is greater than the second heating rate.

18. The process of claim 14 wherein the process step of raising the temperature of the oxidized polyethylene and amino functional silicone to at least the melt point of the oxidixed polyethylene constituent comprised the further process steps of:

raising the temperature of the oxidized polyethylene and amino functional silicone, with agitation, at a first heating rate through the melting point of the oxidized polyethylene component for a first time interval, then during a second time interval, further heating at a second heating rate to raise the temperature to a maximum temperature or maximum temperature range approximately 7–1? deg. C. beyond the melt point of the oxidized polyethylene component, and, maintaining the reactants at this maximum elevated temperature or maximum temperature range for a period of between about 10–15 minutes.

19. The process of claim 14 which includes a further process step of adjusting the pH of the coemulsion to maintain the pH in the range of 4–6.

20. The article according to claim 1 wherein the substrate of the article is an asphalt comprising article.

21. The article according to claim 20 wherein the article is a roofing shingle.

22. The article according to claim 1 wherein the substrate of the article is at least partially comprised of fibers.

23. The article according to claim 22 wherein the substrate of the article at least partially comprised of fibers is selected from the group consisting of: textiles, fibers, ropes, tows, webs, threads, and fiberfill material.

24. The article according to claim 1 wherein the substrate of the article is a release paper, release strip or a release sheet.

* * * * *